July 13, 1937.  J. O. BURDETTE ET AL  2,086,523
REPRODUCING MECHANISM
Filed Feb. 5, 1935   7 Sheets-Sheet 2

INVENTORS.
J. O. BURDETTE and
H. H. RAGATZ
BY
ATTORNEY.

July 13, 1937.   J. O. BURDETTE ET AL   2,086,523
REPRODUCING MECHANISM
Filed Feb. 5, 1935   7 Sheets-Sheet 4

INVENTORS.
J. O. BURDETTE and
H. H. RAGATZ
BY
ATTORNEY

July 13, 1937.  J. O. BURDETTE ET AL  2,086,523
REPRODUCING MECHANISM
Filed Feb. 5, 1935  7 Sheets-Sheet 6

INVENTORS.
J. O. BURDETTE and
H. H. RAGATZ
BY
ATTORNEY.

July 13, 1937.   J. O. BURDETTE ET AL   2,086,523
REPRODUCING MECHANISM
Filed Feb. 5, 1935                7 Sheets-Sheet 7

INVENTORS.
J.O. BURDETTE and
H.H. RAGATZ
BY
ATTORNEY.

Patented July 13, 1937

2,086,523

UNITED STATES PATENT OFFICE 2,086,523

REPRODUCING MECHANISM

John O. Burdette and Henry H. Ragatz, Denver, Colo.

Application February 5, 1935, Serial No. 5,158

58 Claims. (Cl. 33—18)

Our invention relates to a mechanism for reproducing handwriting and the like.

An object of the invention is to provide a machine of the above stated character which is capable of accurately reproducing a signature or the like, and repeating the reproduction without manual regulation, during the period of its operation.

A further object of the invention is to provide a single mechanism which may be utilized in the production of records of the inscribed copy, and which in a separate operation will cooperate with such records in the reproduction of the copy.

Another object of the invention resides in the provision of a mechanism capable of reproducing several lines of copy arranged in sequence, in a single, continuous operation.

Still another object of the invention is to provide a novel method and means for the scribing of records employed in the reproducing operation of the mechanism, to provide an accurate reproduction of the copy.

A further object of our invention resides in a novel method and means for providing a universal movement for the writing element of the mechanism.

Other objects reside in novel details of construction and in novel combinations and arrangements of parts as will more fully appear in the course of the following description.

Referring now to the drawings in the several views of which like parts have been similarly designated, Figure 28 is a fragmentary section taken along the line 28—28, Figure 10.

Figures 12, 13, 14, 15, 16, 17:
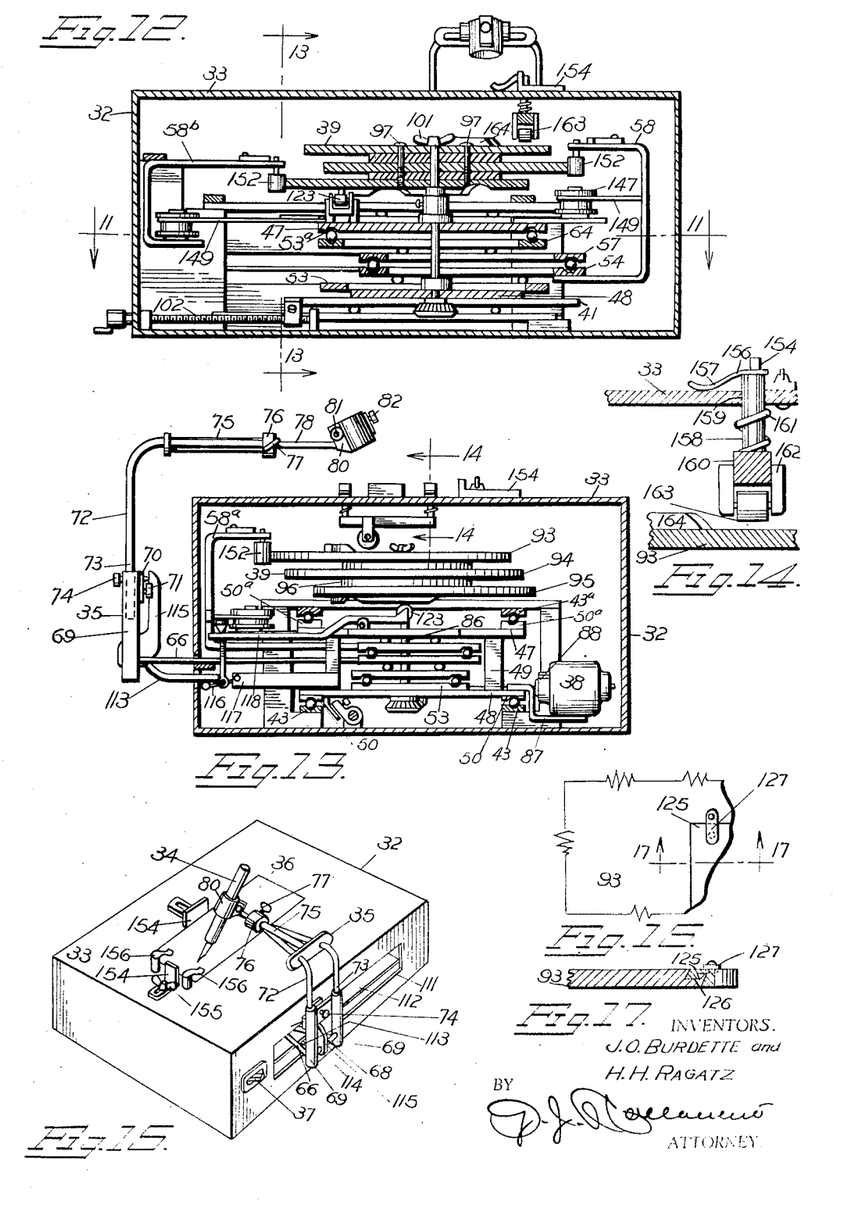
Figure 12 is a section taken along the line 12—12, Figure 6.
Figure 13 is a section taken along the line 13—13, Figure 6.
Figure 14 is an enlarged, fragmentary section taken along the line 14—14, Figure 13.
Figure 15 is a perspective view of the entire mechanism assembly, illustrating the pen and paper arrangement employed in its operation.
Figure 16 is an enlarged, fragmentary plan view of a removable insert in operative position in the record assembly.
Figure 17 is a section taken along the line 17—17, Figure 16.

Referring first to Figure 15, the mechanism comprises a housing 32 of any suitable construction, which may be provided with a hinged top or side permitting access to the interior of the housing, the top 33 of which provides a writing receiving support, and a pen 34 carried by an arm 35, having a universal movement as will be explained hereinafter, is moved across the surface of a sheet of paper 36 in reproducing handwriting or other copy.

While a fountain pen has been illustrated as a convenient writing implement, it is to be understood that any marking implement or copy-reproducing means may be used within the spirit and scope of the invention. Likewise, a sheet of paper has been illustrated as the medium on which the handwriting is inscribed, but it is also within contemplation of the invention that metal or various other materials may be employed.

A switch 37 on the housing 32 controls the operation of a motor 38 (Figure 1) which drives the mechanism that moves the pen through the intermediary of the arm across the paper. The movements of the pen are directed by a record assembly 39 rotating within the housing 32.

Within the housing 32, a frame 40 (Figures 1 and 2) slidably supports a carriage-element designated generally as 41. The frame 40 comprises a set of interconnected supports 42, and a pair of cross-members 43, fixedly held on the supports, extend between the same in an east-and-west direction.

A set of uprights 44 support a pair of cross-members 45 extending in a north-and-south direction between the same, which are disposed at a higher elevation than the cross-members 43 in order to provide sufficient space between the two pairs of cross-members for the moving parts of the carriage-element 41.

Adjacent the ends of cross-members 45, a pair of cross-members 43a are fixed thereon and extend therebetween in an east-and-west direction and in vertical alinement with the cross-members 43. This arrangement permits the cross-members 43 and 43a to be employed as cooperative tracks or slides for the carriage-element 41.

The slides 43 have a lengthwise groove 46 in their upper surfaces, and the slides 43a have a lengthwise groove 46a in their lower surfaces.

The reciprocating carriage element 41 (Figures 12 and 13) comprises an upper deck 47 and a lower deck 48 maintained in separated, superposed relation by means of spacers 49 and is provided at its north and south ends with pairs of runners 50 and 50a which travel along the tracks 43 and 43a. The lower runners 50 have a lengthwise groove 46a in their lower surfaces, alined with the groove 46 of track 43, and the two grooves 46 and 46a provide a race for balls 51 held in spaced relation by spacers 52 of any suitable construction (Figures 3 and 4) to permit anti-friction movement of the runners 50 along the tracks.

In the same way, the upper surfaces of upper runners 50a are grooved for the reception of ball-bearings 51.

Fixedly mounted on deck 48 in an east-and-west direction are a pair of slides 53, and fixedly mounted on deck 47 in a north-and-south direction are a pair of slides 53a. The slides 53 have lengthwise grooves 46 in their upper surfaces and the slides 53a have lengthwise grooves 46a in their under surfaces.

A carriage 54 comprising runners 55 and cross-members 56 travels along slides 53, and runners 55 have lengthwise grooves 46a in their under surfaces in alinement with grooves 46 in slides 53 to provide a race for ball-bearings 51. The upper surfaces of cross-members 56 have lengthwise grooves 46, and the members 56 serve as a track for a carriage 57, which travels along the same in a north-and-south direction.

A U-shaped arm 58 is fixed on carriage 54 and projects outwardly therefrom in a westerly direction. At its free end, the arm 58 is apertured at 59 to provide a socket, and a scribing point 60 is slidably fitted in the socket 59 and held against gravitational displacement by a cotter-pin or other suitable device. A spring clamp 61 is pivotally mounted on arm 58 and engages with the upper end of the scribing point 60 to resist upward movement of the same.

The carriage 57 comprising runners 62 and cross-members 63 travels along the track formed by cross-members 56, the runners 62 having lengthwise grooves 46a in the under surfaces in alinement with grooves 46 in track 56 to provide a race for ball-bearings 51. The upper surfaces of cross-members 63 have lengthwise grooves 46, and the members 63 also serve as slides for a carriage 64 which travels along the same in an east-and-west direction.

The pen-carrying arm 35 of the mechanism (Figure 10) is fixedly held on carriage 57. The arm 35 comprises a bar 65 attached to the carriage 57, projecting from the carriage in a southerly direction and terminating in a forked extension 66, having alined apertures 67 for the reception of a shaft 68 disposed transversely of the lengthwise axis of the extension 66.

A pair of hollow uprights 69 acting as sockets are mounted on the ends of shaft 68 for pivotal movement therewith, and a yoke 70 is held between the upper ends of the uprights 69. The yoke 70 and uprights 69 have alined apertures to permit entrance of set screws 71.

An L-shaped extension 72 having a bifurcated end 73 telescopically fitted in the hollow uprights 69 is held in selective positions by set screws 71. At its opposite end, the extension 72 has a tubular socket 75, and a collar 76 is mounted at the free end of the socket 75. The collar and socket have alined apertures to receive a set screw 77.

A stem 78 slidably fitted in socket 75 is suspended for rotation therein and is held in selective positions by the set screw 77. A lug 79 on the opposite end of stem 78 pivotally carries a pen holder 80, and screws 81 permit the holder 80 to be fixed in adjusted positions about its pivot. An adjustable clamping device 82 holds the pen 34 or other implement in holder 80. The foregoing arrangement permits universal movement of the pen.

Figure 11:
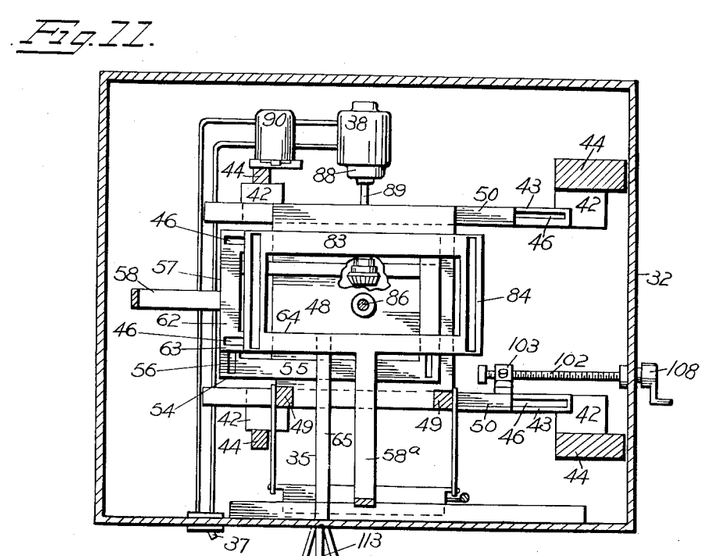
Figure 11 is a plan view of the carriage assembly used in the mechanism.

The carriage 64 (Figures 11 and 12) comprising runners 83 and cross-members 84 travels along slides 63, and runners 83 have lengthwise grooves 46a in their under surfaces in alinement with grooves 46 in slides 63 to provide a race for ball-bearings 51. The upper surfaces of cross-members 84 have lengthwise grooves 46 in vertical alinement with the grooves 46a on slides 53a, and form a race for ball-bearings 51 in the manner previously described.

An arm 58a, of the same construction as arm 58 is fixed on carriage 64 and projects outwardly from the same in a southerly direction.

A cross-member 85 fixed on uprights 44 and extended therebetween supports an arm 58b similar in construction to arms 58 and 58a. The arm 58b is fixed on cross-member 85 and thus constitutes a stationary element.

A vertical rotary shaft 86 is journaled in decks 47 and 48 centrally thereof for movement with the carriage element 41. The motor 38 mounted on a platform 87 fixedly carried by deck 48 has a driving connection with shaft 86.

Suitable reduction gears are contained in a housing 88 connected with the housing of motor 38. Since the reduction gears are of conventional construction and arrangement, detailed description appears unnecessary. The drive shaft 89 of motor 38 carries a mitre gear which meshes with a mitre gear at the lower end of shaft 86.

A rheostat in a housing 90 carried on deck 48 is connected in the motor circuit for varying the speed of the motor. Since the circuit and various elements in same are of conventional construction and arrangement, detailed description appears unnecessary.

From the foregoing it is apparent that shaft 86 will be caused to rotate at a relatively slow speed, and that the entire driving assembly will be movable with the carriage element 41, but held in fixed relation on said element.

A rest 91 is fixed on the shaft 86 for conjoint rotation therewith, and a pin 92 projects upwardly from the rest 91 for engagement with the record-unit 39.

In order to better understand the reproducing operation, a description of the method of producing the records will first be given.

The record-unit 39 includes three disks maintained in spaced relation by any suitable spacing means, provided such means are of considerably lesser diameter than the disks. In the drawings, the unit 39 has been illustrated as comprising separate parts, but it is to be understood that when desired, the unit may be of one-piece construction. Likewise, metal disks are desirable because of their permanence and good wearing qualities, but any suitable material may be employed in the records.

Figures 1, 3, 4, 5:
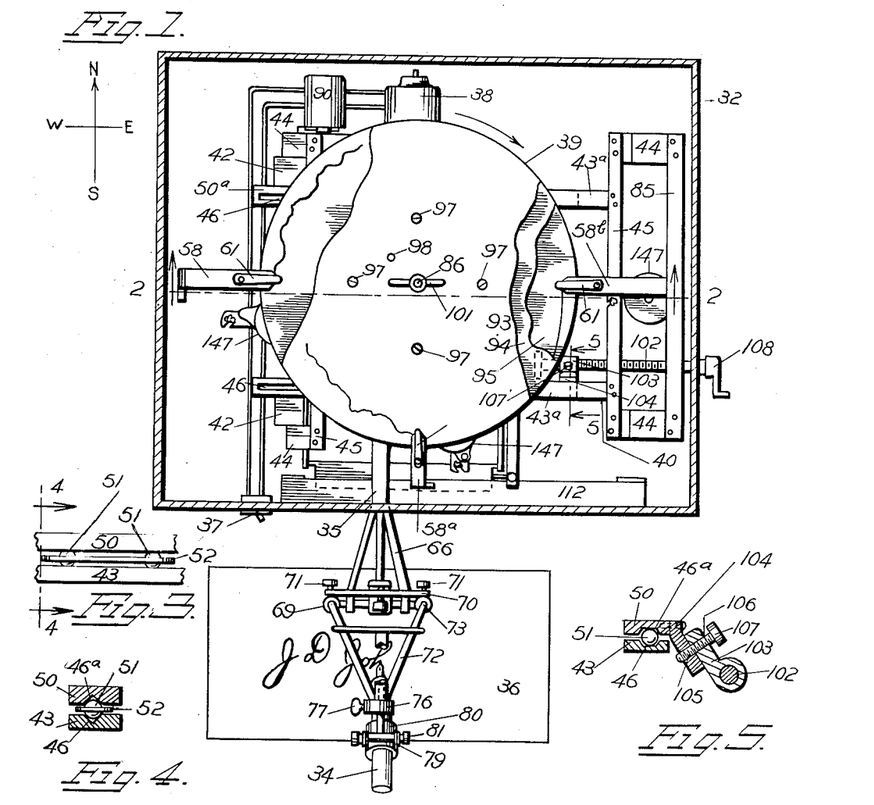
Figure 1 is a plan view of the mechanism, illustrating its record-scribing arrangement, with the record-assembly partially broken, and with a directional indicator illustrated to facilitate understanding of the direction of movement of the various elements of the mechanism.
Figure 3 represents an enlarged fragmentary elevation of the ball-bearing assembly employed in the mechanism.
Figure 4 is a section taken along the line 4—4, Figure 3.
Figure 5 is an enlarged section taken along the line 5—5, Figure 1.
Figure 2:
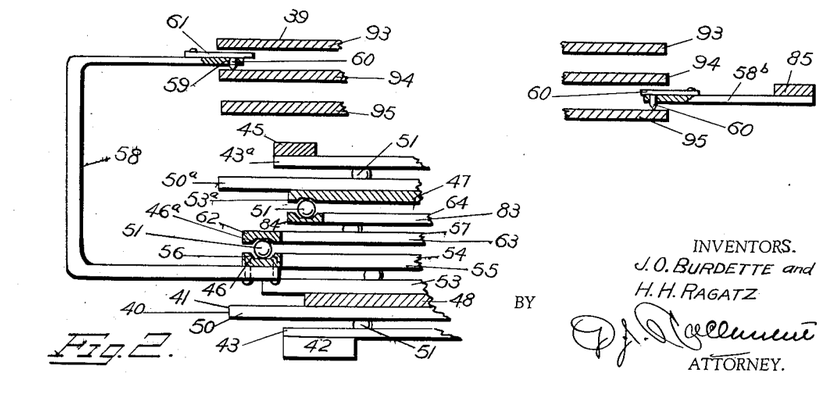
Figure 2 is a enlarged, fragmentary section taken along the line 2—2, Figure 1.

As illustrated in Figures 1, 12 and 13, the record-unit 39 comprises disks 93, 94 and 95 held in spaced relation by spacers 96 and a series of alined apertures in the disks and spacers are provided to receive clamping screws 97, which hold the component parts of the unit against relative movement. A keying pin 98 or other suitable means is provided in order to locate the plates in their original positions after they have been separated.

Figures 6, 7, 8:
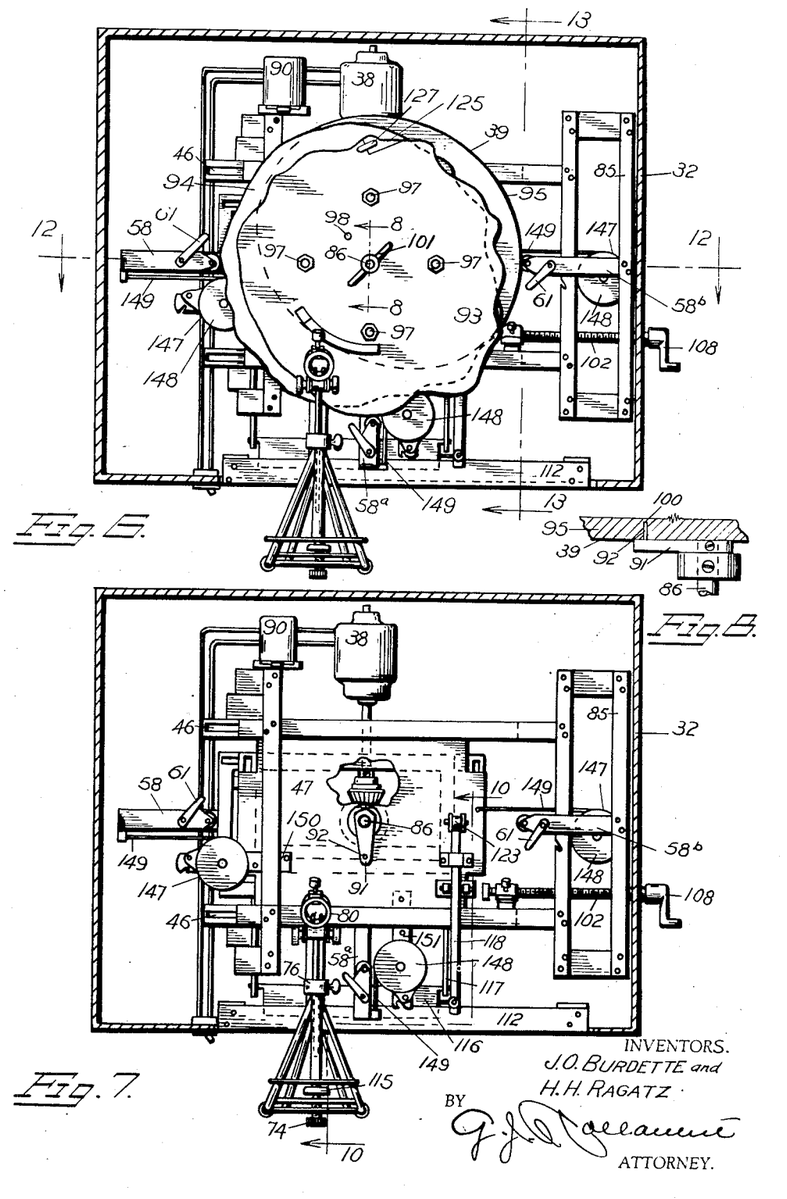
Figure 6 represents a plan view, similar to Figure 1, illustrating the reproducing arrangement of the mechanism.
Figure 7 is a plan view similar to Figure 6, with the record-assembly removed, partially broken to illustrate the driving connection of the mechanism.
Figure 8 is an enlarged fragmentary section taken along the line 8—8, Figure 6.

A central aperture 99 in the disks and spacers (Figure 9) permits the unit to be slidably fitted on shaft 86 and seat upon rest 91. An aperture 100 in the under surface of disk 95 is provided to admit pin 92 (Figure 8). The record-unit is held firmly in place on shaft 86 by tightening a wing nut 101 and the pin engaging disk 95 causes the unit to rotate conjointly with the shaft 86.

When the record-unit is in operative position on the rest 91, the elevation of the respective disks brings disks 93 into engagement with the scribing point on arm 58a, disk 94 into engagement with the scribing point on arm 58, and disk 95 into engagement with arm 58b.

The pen-carrying arm 35 has a universal movement by reason of the carriage 57 being disposed between sliding elements which render it freely movable in both a north-and-south and east-and-west direction.

In this connection it will be observed that the carriage-element 41 has all its movable parts disposed in such manner, that the direction of motion of one element is at right angles to the direction of motion of another complementary element, with the result that the motion of each of the movable arms 35 and 58a is a resultant of two forces at 90° to each other, while arm 58 is limited to east-and-west movement only, by reason of carriage 54 being slidable along slides 53 fixedly mounted on deck 48.

The movement of carriage element 41 in an east-and-west direction effects variations in the distance between stationary arm 58b and shaft 86.

A screw 102 is mounted parallel to one of the tracks 43, and a rider 103 is movable on the screw. A lug 104 (Figure 5) fixed on runner 50 at its end adjacent the screw 102, is apertured at 105. The rider 103 is likewise apertured at 106, and when the apertures are alined, the lug is connected with the rider by means of a screw 107. A crank 108 is provided for manual rotation of the screw.

In order to make a record of handwriting, the extension 72 is inserted in sockets 69 in the manner illustrated in Figure 1, and a sheet of paper 36 is placed beneath the pen 34. The carriage element 41 is moved to its most westerly position and the runner 50 is operatively connected with the rider 103 on screw 102. The motor circuit is closed by movement of switch 37, and the record-unit 39 commences to rotate in the direction indicated by the arrow in Figure 1.

The person whose handwriting is to be reproduced presses the pen 34 against the paper 36 and makes his signature or other legend with the pen in conventional manner. Each stroke of the pen is communicated to the carriage element 41, and the movable arms 58 and 58a through the intermediary of arm 35. Manual rotation of crank 108 causes the carriage element to travel in a progressive easterly direction, within the range of movement by the groove 46 in track 43.

As the disks rotate, the scribing points make scribing marks on the surfaces of the records with which they engage. The upper disk 93 records the up and down finger strokes of the writer, and the middle disk 94 records the left and right finger strokes.

The aggregate of the writing movements from left to right tends to move the arm 58 toward the central shaft 86. In order that the stencil may be kept at the periphery, the screw 102 is rotated, causing a progressive movement of the carriage-element 41 in an easterly direction, and this movement is recorded on disk 95 by the scribing point 60 held on arm 58b.

When the signature or legend is completed, the disks are returned to the starting point by turning crank 108, and a complete cycle is thereby recorded on the disks. The motor is stopped and the records are removed from the shaft 86.

The disks are next cut along the scribing marks and the undulating peripheral surfaces thus become cams for the reproducing operation of the device. The disks are next reassembled in their original positions relative to each other.

In order to record variations in shading of the pen strokes the under surface of disk 95 (Figure 9) is marked with an annular or segmental line having its axis of rotation at the center of aperture 99. Depressions 109 in the surface are employed for heavier pen strokes, and light lines or removal of the pen from the page are recorded by ridges 110, the elevation of the ridge determining the extent the pen is lifted in the reproducing operation, as will be explained hereinafter.

The housing 32 is slotted at 111 (Figure 15) and a plate 112 providing a slide is fixed inside the lower margin of this slot. The extension 66 of arm 35 is slidably supported on slide 112. A lever 113 is fulcrumed at 114 on shaft 68 between the bifurcations of extension 66, and has an upright arm 115 terminating in the horizontal plane of yoke 70. The yoke is apertured to admit an adjusting screw 74 which bears against arm 115, for initially determining the position of the pen 34 relative to paper 36.

Figures 9, 10:
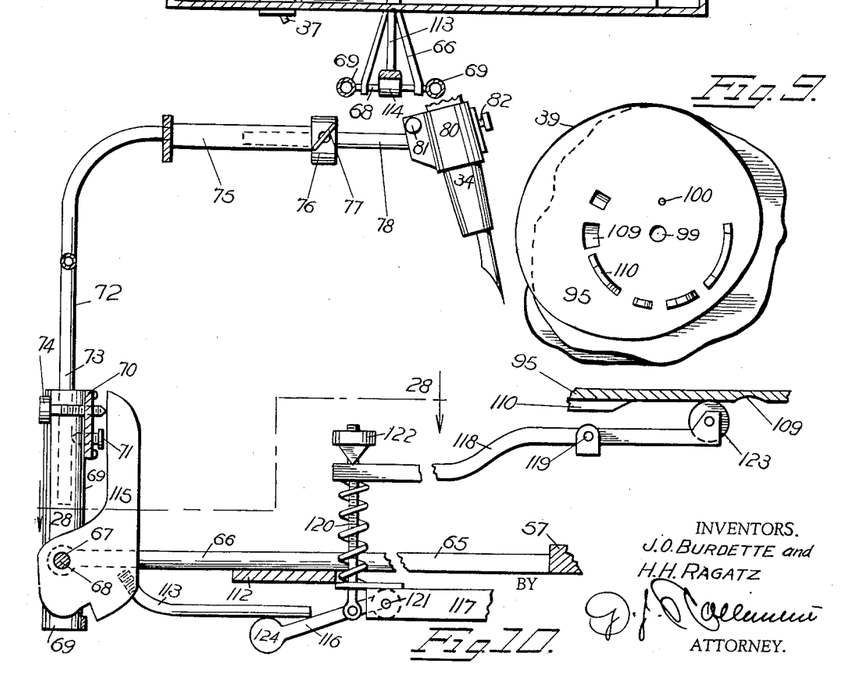
Figure 9 represents a bottom plan view of the record assembly.
Figure 10 is an enlarged, fragmentary section taken along the line 10—10, Figure 7.

At its opposite end, lever 113 rests upon a bar 116 pivoted at 121 on brackets 117 carried on deck 48. A second lever 118 fulcrumed at 119 on deck 47, carries a spring-pressed rod 120 connected with bar 116 at a distance from its pivot 121. The rod 120 is provided with an adjusting nut 122 as indicated in Figure 10. The opposite end of lever 118 is disposed within the sphere of rotation of disk 95, and a roller 123 mounted on this end of the lever 118 engages the ridges 110 and depressions 109 to raise or lower the pen 34.

The bar 116 has its non-pivoted edge enlarged as indicated at 124, and the free end of lever 113 rests on enlargement 124 to be moved thereby, subject to variations in the elevation of roller 123.

From the foregoing it will be observed that in the reproducing operation, when it is desired to lift the pen 34 from the paper 36 preparatory to commencing a new stroke at a different position as in dotting "t's" and crossing "t's", a sufficient elevation of ridge 110 will cause the pen to be lifted clear of the paper, and at the same time cams 93, 94 and 95 will effect the necessary east-and-west and north-and-south movements of the pen.

To prevent unauthorized use of the record-unit 39, after the cams have been cut, a fragmentary piece 125 of one or more of the disks is cut out as illustrated in Figures 6, 16 and 17. It is advisable to have the cam edge of piece 125 include the letter-forming undulations of at least two letters in order that a mutilated reproduction will be produced by the unauthorized use of the other segment of the disk. For purposes of illustration the cut has been applied to disk 93, but it will be equally effective, regardless of which disk is employed.

In order to insure an immovable fit in operative position, a double dovetail joint 126 is provided, but any joint which will hold the component parts against relative movement may be availed of. A pivoted spring 127 on disk 93 may be moved into engagement with piece 125 as a further safeguard against relative movement.

The user of the machine removes the piece 125 when the record is not in use and the piece may be carried on the person of the record owner, or locked in a storage place apart from the record. Without the cam edge on piece 125, the record on disk 93 is useless for reproduction.

As a modification of the method of inscribing the record on the respective disks of record assembly 39, the disks 93, 94 and 95 may have their upper surfaces coated with a light-sensitive material. The record inscribing may be accomplished on a mechanism employed solely for that purpose, or this operation may be effected on a mechanism which is also equipped for reproduction. Commercial requirements will determine which practice is to be followed.

When a separate machine is used, the mechanism will be the same as hereinbefore described, except that the arms 58, 58a and 58b will be omitted and brackets 128 will be mounted on carriages 54 and 64, and on cross-member 85. At their extended ends, the brackets are flanged at 129 to provide seats for photo-electric elements 130.

Each of said elements 130 comprises a housing 131 having an electric light globe 132 within the same. A window 133 in the housing permits observation of the operation of the globe. Extending from an aperture 134 in the housing in horizontal alinement with globe 132 is a light conduit 135 which terminates within the sphere of rotation of the record assembly 39 near the periphery of the same. The lengthwise axis of the conduit 135 thus parallels the upper surfaces of disks 93, 94 and 95.

A lens 136 is fastened in the housing across the aperture 134. This lens is of the conventional type which directs the light rays in a horizontal direction in parallel, and also parallel to the upper surfaces of the disks.

A lug 137 at the free end of conduit 135 disposes a reflector 138 in the path of the rays traveling through the conduit at a 135° angle to their direction of movement and the upper surfaces of the disks, or stated differently, at 45° to the axis of rotation of the record assembly. As a result of this arrangement the rays passing from the respective conduits 135 are downwardly directed onto their complemental disks, perpendicular to the upper surfaces of the same.

Figure 18:
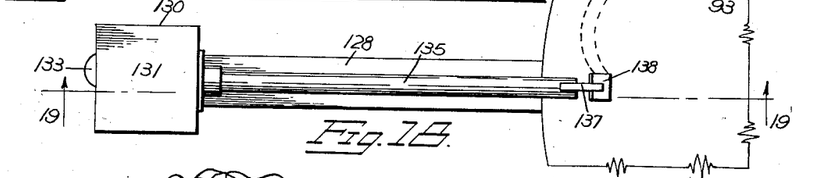
Figure 18 represents a plan view of a modification of the marking element for indicating the cam edges of the records.
Figure 19:
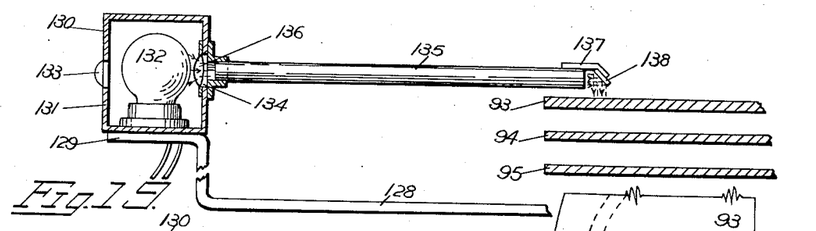
Figure 19 is a section taken along the line 19—19, Figure 18.
Figure 20:
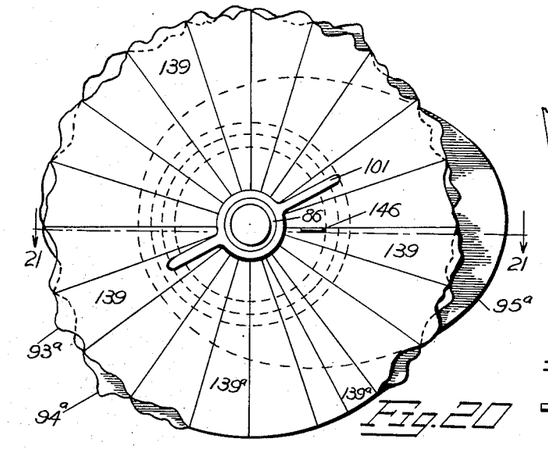
Figure 20 represents a modification of the record assembly.
Figure 21:
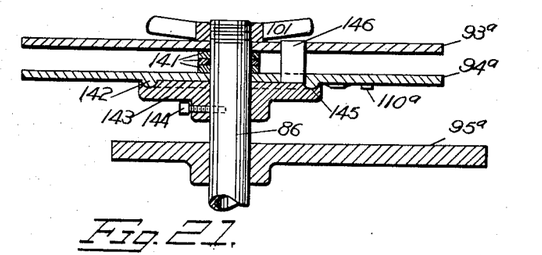
Figure 21 is a section taken along the line 21—21, Figure 20.
Figure 22:
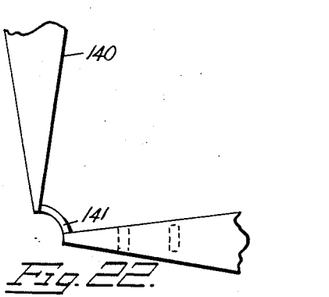
Figure 22 is a plan view of one of the record-units used in the modification illustrated in Figure 20.
Figures 22, 25, 26, 27:
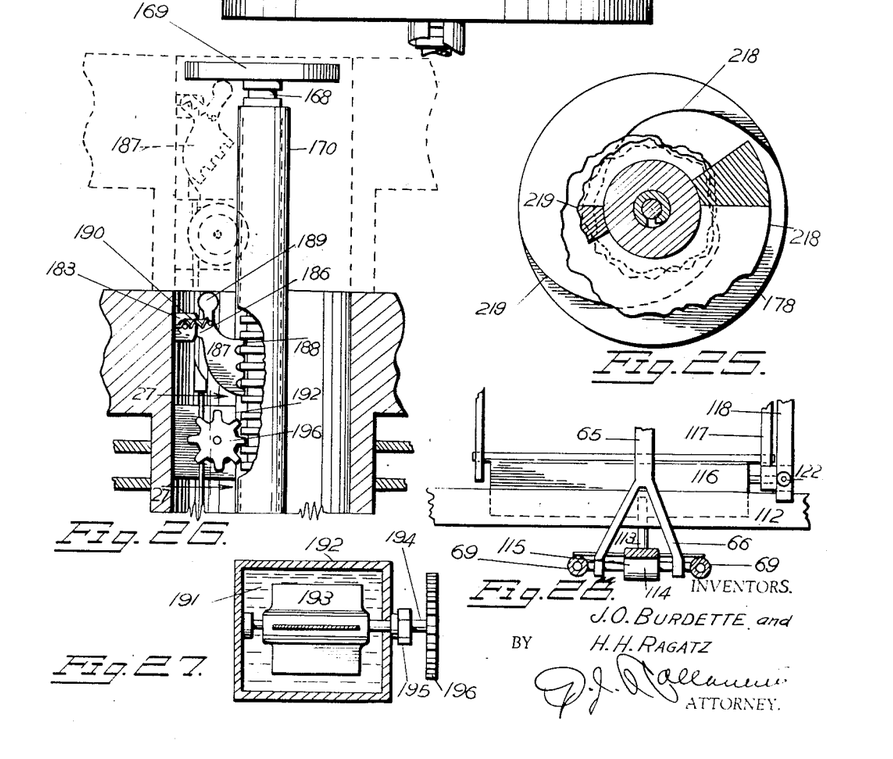
Figure 25 is a section taken along the line 25—25, Figure 24.
Figure 26 is an enlarged fragmentary view, partially in section, of the elevating mechanism employed in connection with the record assembly illustrated in Figure 24.
Figure 27 is an enlarged section, taken along the line 27—27, Figure 26.
Figure 23:
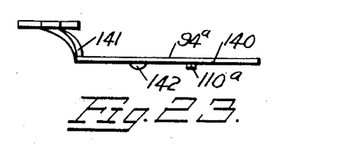
Figure 23 is a vertical elevation of the unit illustrated in Figure 22.

The writing movements are communicated to the light-sensitive surfaces by the operation of the mechanism as hereinbefore explained, through the photo-electric action of the elements 130 in the manner indicated by the dotted lines in Figure 18.

When the complete cycle is recorded, the record assembly 39 is removed and the light-sensitive surfaces are subjected to the action of a suitable developer. It will be observed that the path of the light rays as recorded is relatively wide as compared with the scribe lines shown in Figure 1.

In order to obtain a cam edge accurately indicating the true position of the pen-carrying arm 35 during the original writing, the records are cut along the inner edge of the photo-electric pattern and the cam-engaging rollers can be made larger than in the preferred modification. The record assembly when thus completed is in all respects similar to the record assembly previously described.

It is sometimes desirable to employ the mechanism in producing written legends for advertising purposes, such as window displays and the like, where an exact reproduction of a particular handwriting is not required. For this purpose, the modification of the record assembly illustrated in Figures 20 to 23 inclusive has been devised.

The lower disk 95a of this modification which controls the arm movement in an east-and-west direction is preferably constructed as a fixed element on shaft 86, and need not be moved. This disk or cam is substantially elliptical in order to produce a complete cycle in the writing operation. The two upper disks 93a and 94a are formed by a series of radial sections 139 and the peripheral segment of each section begins and ends on a true arc of a circle with intermediate undulations to produce the letter-forming movements of the pen.

Each section 139 comprises a component part of a letter-producing cam unit 140, composed of two such sections disposed at 90° to each other in spaced planes, and fixedly connected by segmental risers 141. The under surface of section 139 forming a constituent part of disk 94a has a segmental rounded boss 142, and at a distance from the boss 142, a ridge 110a corresponding to a segment of the ridges 110 of Figure 9, projects from said surface. Depressions similar to the depressions 109 of Figure 9 may also be employed, but have not been illustrated.

Each unit 140 is capable of producing a complete letter, character or symbol, and by having the periphery of each section begin and end on a true arc, the units when assembled are capable of producing continuous writing.

Spacing sections 139a having arcuate peripheral edges, but in all other respects identical with units 140, produce the required spacing between words and the like, and these sections may be made in different widths (Figure 20) to control the extent of spacing in the scripts.

In assembling the disks 93a and 94a for operation, a mounting plate 143 held by a set-screw 144 on shaft 86 for conjoint rotation therewith, provides a support for the disks. The plate 143 has an annular groove 145 in its upper surface to admit the segmental bosses 142 of a series of units 140 arranged side-by-side to produce the legend or other script. The series of units thus forms the disks 93a and 94a which are held in place by wing nut 101. In order to provide for conjoint rotation of disks 93a and 94a on plate 143, a fin 146 extends through complementary slots in the disks and prevents separate relative movement of the disks.

This fin is preferably constructed integrally with plate 143 and is the intermediary through which rotation of plate 143 is imparted to disks 93a and 94a. The fin 146 also serves as an indicatory element to mark the starting point in the arrangement of the sections into a complete cam-unit. By having the fin fixed with relation to disk 95a, the movements of the respective disks relative to their co-operative cam-followers are synchronized to produce an accurate reproduction.

The units collectively may be likened to a font of type, particularly since each produces a complete writing in itself, and may be readily interchanged and arbitrarily arranged.

When it is desired to employ the mechanism as a reproducing machine, the arms 58 and 58a and the carriage element 41 are operatively connected with spring elements 147, (Figures 6, 7 and 12).

Each element 147 comprises a spring controlled rotary drum 148 having a flexible cord 149 attached thereto. A bracket 150 fastened on deck 47 supports one of the drums 148 in proximity to the arm 58, and the cord 149 is connected with arm 58. A bracket 151 also fastened on deck 47 supports another of the drums 148 in proximity to the arm 58, and the cord 149 of drum 148 is connected with arm 58a. The third drum 148 is supported on the fixed arm 58b at a distance from its scribing end, and the cord 149 of this drum is connected with deck 47.

Before commencing the reproducing operation, the scribing points 60 are removed and rollers 152 are inserted in place thereof on the arms 58, 58a and 58b. The rollers 152 depend from the arms in the same manner as scribing points 60, but to a greater distance in order that they may bear against the cam edges of the disks. The spring-elements 147 urge the arms 58 and 58a constantly toward the cams, while the spring-element connected with the carriage element 41 urges the cam edge of disk 95 toward the roller 152 of the fixed arm 58b (Figure 12).

The above arrangement insures that all the horizontal movements of the pen during its stenciling operation will be repeated during the reproducing operation.

The corresponding vertical movements of the pen are effected by means of the pressure of disk 95 on roller 123 mounted on lever 118. When roller 123 is held against the plane surface of disk 95, the pen 34 bears against the paper 36 with normal writing pressure. When the roller enters the depressions 109, the pressure on lever 118 is relieved with the result that the pen-carrying arm 35 is free to tilt forward under the combined weight of arm 72 and pen 34 and presses the pen against the paper to increase the writing pressure.

When the roller 123 encounters one of the ridges 110, the end of lever 118 carrying the spring-pressed rod 120 is raised, and this movement is in turn communicated to the arm 35 through the pressure exerted on yoke 70 by upright arm 115. If the ridge 110 is of sufficient elevation, the pen will be lifted from the paper. This movement is of particular importance in dotting "i's" and crossing "t's" as well as returning the pen to the original starting position, when a continuous operation is required.

In the reproducing operation of the mechanism, the carriage element 41 is moved to its most westerly position, and the extension 73 on arm 35 is placed in the position indicated in Figure 15. The proper writing position for the pen is obtained by adjusting the parts 72, 78, 80 and the pen 34 in the holder 80.

The motor 38 is started and the record assembly begins to rotate with shaft 86. The pen-carrying arm receives its north-and-south strokes from the movement of carriage 57 induced by the engagement of the cam edge of disk 93 with its complementary roller 152, while the east-and-west finger strokes are imparted to the carriage 54 and thence to arm 35 by engagement of the cam edge of disk 94 with its complementary roller 152.

The progressive movement of the carriage element from west to east, and its return movement from east to west are controlled by engagement of the roller 152 on fixed arm 58b with the cam edge of disk 95. In this connection it will be understood that when the cam edge of disk 95 is on a true arc, there will be no general carriage movement, but any variation from the true arc will cause such movement. The "progressive" movement referred to is actually selective and intermittent as well, and progressive only in the sense that a complete writing cycle is produced by each revolution of the cam 95.

Simultaneously with the formation of the various letters by the movements just described, the lever system actuated by engagement of roller 123 with the under surface of disk 95 effects vertical movement of pen 34 so that the shading, spacing and the like, of the original writing are reproduced.

After the reproduction of the component letters of the script has been effected in sequence, the pen is caused to make the movements necessary for crossing "t's" and dotting "i's" with the same strokes as were made in the original writing, and thereafter the cam 95 directs the carriage element 41 and pen-carrying arm 35 back to the original starting point. As a complete writing cycle has been produced, it is apparent that so long as the motor is operated, the complete signature is repeatedly reproduced in an automatic operation. It will be understood that in addition to its universal movement directed by the cam-unit 39, the pen has a second universal movement which may be manually effected by rotation of stem 78 in socket 75, and by rotation of holder 80 about its pivot 81. These rotations about relative transverse axes produce a universal movement of a pen held in holder 80. This arrangement permits the pen to be set in any selective position and the reproduction will be effected without distortion, since the movement imparted to the arm 35 by any cam-unit is always uniform.

To facilitate the use of the continuous operation in reproducing signatures, for example, in signing bonds or the like, a paper-holder 153 is provided on the top 33 of housing 32.

This device comprises two adjustable guides 154 which may be fixed in selective positions by wing nuts 155. Adjacent one of the guides 154 are two automatic cam-controlled clamps 156.

Each clamp 156 comprises a spring 157 carried on a depending stud 158 slidably fitted in an aperture 159 of the housing 32. The lower end of stud 158 is enlarged to provide a shoulder 160 and a coil spring 161 on stud 158 rests on the shoulder 160 with its upper end bearing against the housing 32. Legs 162 fixed on opposite sides of shoulder 160 are apertured in their lower end to receive a shaft on which a roller 163 is held between the legs.

On the upper surface of disk 93, within the sector of its cam edge between the completion and beginning of the signature, a ridge 164 is disposed for engagement with roller 163. As the roller 163 contacts ridge 164 the stud 158 is moved upwardly against the resistance of spring 161 and lifts spring 157 from top 33.

The operator is then able to readily remove the signed paper and insert an unsigned sheet in its place. When the record assembly rotates sufficiently to carry ridge 164 past the roller 163, spring 161 drives stud 158 downwardly and spring 157 clamps the newly inserted sheet of paper against top 33.

It is also desirable for certain purposes to have a mechanism capable of producing a plurality of separated lines of copy in continuous sequence, with provision for repeating the inscribed legend in a continuous automatic operation.

Figure 29:
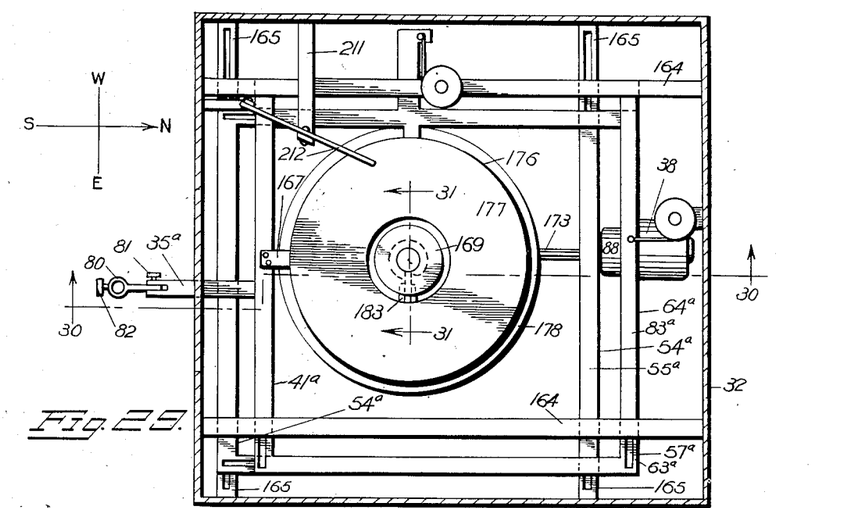
Figure 29 represents a plan view of a modification of the mechanism, with the record assembly illustrated in Figure 24, in operative position.
Figures 30, 31:
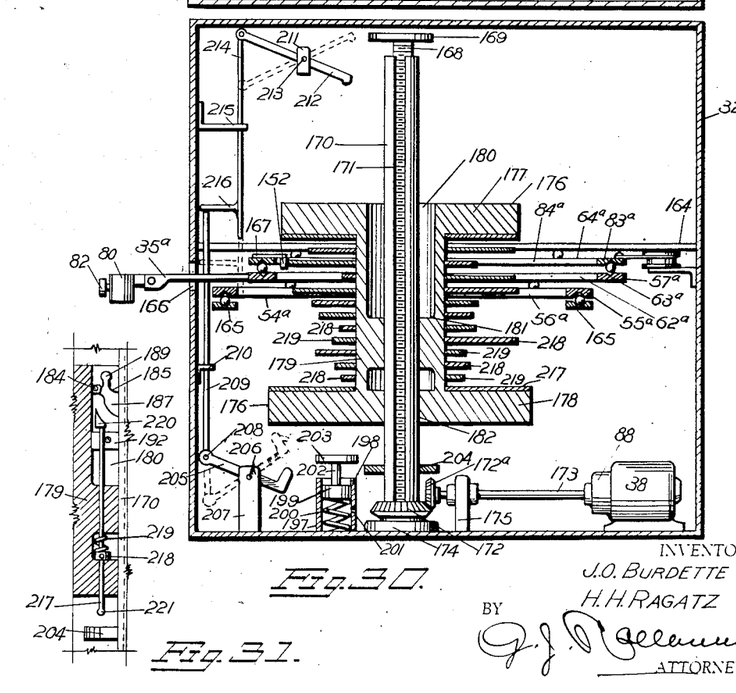
Figure 30 is a section taken along the line 30—30, Figure 29.
Figure 31 is an enlarged, fragmentary section taken along the line 31—31, Figure 29.

A modification of the mechanism to carry out the foregoing objects has been illustrated in Figures 24 to 27 inclusive, and Figures 29, 30 and 31.

A carriage-assembly 41a within the housing 32 has a universal movement of the same type as previously described, with the exception that there is no general carriage-element movement in the east-and-west direction. In order to permit vertical movement of the record in this mechanism, in a manner to be hereinafter explained, the carriage-assembly 41a is positioned substantially midway between the top and bottom of housing 32.

A pair of cross-members 164 are fastened on the opposed upright walls of housing 32 in parallel, and a second pair of cross-members 165 are fastened on upright walls of housing 32 and disposed in parallel at right angles to cross-members 164, at a substantially lower elevation. The members 164 and 165 comprise the fixed slides of the carriage-assembly 41a.

A carriage 54a composed of runners 55a and cross-members 56a travels along slides 165 in an east-and-west direction, the under side of runners 55a having lengthwise grooves 46a in vertical alinement with lengthwise grooves 46 in slides 165 to provide a race for ball-bearings 51.

The cross-members 56a of carriage 54a have a lengthwise groove 46 in their upper surfaces, which provide slides for a carriage 57a which travels thereon in a north-and-south direction.

The carriage 57a comprises runners 62a and cross-members 63a, the under side of the runners 62a being provided with lengthwise grooves 46a in vertical alinement with the grooves 46 of slides 56a, and the cross-members 63a of carriage 57a have lengthwise grooves 46 in their upper surfaces which act as a track for a carriage 64a which travels along the same in an east-and-west direction.

The carriage 64a is likewise composed of runners 83a and cross-members 84a, the runners having lengthwise grooves 46a in their under surfaces in vertical alinement with the grooves 46 in tracks 63a, and the cross-members 84a also have lengthwise grooves 46 in vertical alinement with lengthwise grooves 46a in the under surfaces of fixed slides 164. Each set of complementary grooves of the carriage-assembly provides a race for ball-bearings in the same manner as previously described.

The pen-carrying arm 35a of this mechanism is fixed on carriage 57a and projects laterally therefrom through a slot 166 in housing 32. A pen holder 80 is pivoted on arm 35a and may be fixed in selective positions by means of a set screw 81. A set screw 82 on holder 80 secures a pen 34 or other writing implement within holder 80. A roller 152 of the same type as previously described is carried on an arm 167 fixed on carriage 64a. A second arm 167a is fixed on carriage 54a and supports a cam engaging roller 152. The rollers 152 are also interchangeable with scribing points 60 for stencilling the record-unit of this modification.

An upright screw 168 fixed on the bottom of the housing 32 extends upwardly through the spaces defined by the component elements of carriages 54a, 57a and 64a, and a head 169 at the upper end of the screw 168 is disposed adjacent the top of the housing 32.

A sleeve 170 having a lengthwise slot 171 loosely encases screw 168 and is mounted on a mitre gear 172 at the lower end of screw 168 for conjoint rotation therewith. A second mitre gear 172a mounted on the drive shaft 173 of a motor 38 meshes with mitre gear 172 and is the driving element for rotation of sleeve 170. A housing 174 about the lower end of screw 168 contains a thrust bearing for mitre gears 172 and 172a.

Suitable reduction gearing is contained in a housing 88 attached to motor 38 and drive shaft 173 is journalled in an upright 175 adjacent gear 172a. While an electric motor has been illustrated as a preferred source of motive power for rotation of sleeve 170, it is to be understood that any suitable driving mechanism which will rotate the sleeve at the desired rate may be employed within the spirit and scope of the invention.

A record-carrying drum 176 is slidably fitted for reciprocation on sleeve 170. The drum comprises an upper disk 177, a lower disk 178, and a tubular spacer 179 between the disks. In Figure 30 the disks 177 and 178 and spacer 179 have been illustrated as an integral construction, but it is to be understood that the drum may be composed of separate elements fitted together.

The disk 177 is of lesser diameter than disk 178 and has a central bore 180 providing an annular casing around sleeve 170 and shaft 168. The bore 180 continues through spacer 179 in axial alinement with the bore of disk 177.

Near its lower end, spacer 179 is internally shouldered at 181 to provide a partition in the bore 180, and the shoulder 181 slidably engages sleeve 170. The disk 178 is apertured at 182 for sliding engagement with sleeve 170. The bore is enclosed at its lower end by disk 178 and shoulder 181 to provide a housing. The shoulder 181 and disk 178 likewise act as guides during the reciprocating movement of the drum 176.

Adjacent the upper end of the wall of bore 180, a pair of lugs 183 are fastened for the support of a pivot pin 184 on which a dog 185 is carried. The dog 185 has a laterally extending arm 186 hinged on pin 184, and a depending body 187 normally projecting through the slot 171 in sleeve 170 on a series of teeth 188 on body 185 mesh with the threads of screw 168. Above the arm 186, the body 187 terminates in a rounded head 189.

A tension spring 190 fastened on the wall of bore 180 at an elevation slightly higher than the normal lengthwise axial position of arm 186 is attached to the dog 185 adjacent the point of intersection of the arm and body in order that the lengthwise axis of spring 190 will substantially parallel the normal lengthwise axial position of arm 186.

In its normal position, the dog 185 functions as a nut and when sleeve 170 is rotated, its slotted edge bears against the dog and causes the dog to mount the thread on screw 168 and thereby lift drum 176.

As the drum 176 approaches the top of screw 168, the head 189 on dog 185 engages the head 169 on screw 168. Continued upward pressure of head 189 against head 169 causes dog 185 to swing forward on its pivot 184 shifting the position of spring 190, which immediately upon crossing below the axis of rotation of the dog 185, contracts and withdraws the dog from slot 171, as indicated in the dotted line position in Figure 26. When the teeth 188 on dog 185 are disengaged from the threads of screw 168 all elevating connection of the drum 176 is terminated.

At this point the drum 176 would descend by gravity with considerable force, except for the provision of a motion-reducing device carried in the drum. This device comprises a chamber 191 in a casing 192 within bore 180 beneath dog 185.

A paddle wheel 193 in chamber 191 is fixed on a shaft 194 for rotation therewith. The shaft is journalled in the walls of casing 192, and the chamber 191 is filled with a viscuous liquid, which offers frictional resistance to the rotary movement of the paddle wheel 193.

One end of shaft 194 extends through a wall of chamber 192, and a packing nut 195 on the shaft 194 prevents escape of the fluid from the chamber. A gear wheel 196 is fixed on the extended end of shaft 194 in vertical alinement with dog 185, and the teeth on gear 196 extend into slot 171 and mesh with the thread on screw 168.

The axis of gear 196 is at all times at a fixed distance from the slot 171 as the gear provides an additional bearing surface for the slotted edge of sleeve 170 to effect conjoint rotation of the sleeve and the drum. In the ascending movement of drum 176, gear 196 acts merely as a follower, but when the ascending connection is terminated, gear 196 acts as a motion-reducing means due to the frictional resistance encountered by the paddle wheel 193.

Near the end of its descent, the drum 176 encounters a buffer-element 197. This element comprises a casing 198 in which a piston 199 is fitted for reciprocation. The piston rests on a compression spring 200, disposed in the lower part of casing 198, which is compressed by the downward movement of piston 199. A restricted port 201 in a wall of the casing 198 between the normal elevation of the piston and its maximum plane of descent, permits the casing to function as a compression chamber as well.

A neck 202 extends upwardly from piston 199 and supports a flat head 203 at a distance above the top of casing 198. The head 203 is normally disposed in the path of drum 176 as it returns to the lower end of sleeve 170.

A collar 204 fixed on sleeve 170 provides a stop which limits the downward movement of drum 176.

A lever 205 is fulcrumed at 206 on a support 207 with one of its ends disposed in the sphere of rotation of drum 176. At its opposite end, lever 205 is pivotally connected at 208 to an upright rod 209 supported for reciprocation in a lug 210 attached to a wall of the housing 32.

A laterally extending bracket 211 fixed on the housing 32 substantially in horizontal alinement with the upper end of sleeve 170 supports a lever 212 fulcrumed at 213, an end of which is disposed in the path of drum 176, and the opposite end of which is connected with a depending rod 214 supported for reciprocation in a lug 215 attached to housing 32.

The rods 209 and 214 are connected for conjoint movement by a bar 216 which bears against the housing and acts as a guide during the reciprocating movement of the rods.

A record-unit 217 (Figures 24 and 30) in the form of a helix is fitted upon drum 176 between disks 177 and 178. There are two helical cams 218 and 219 in the unit 217, the cam edges of which terminate at the peripheries of disks 177 and 178. The cam 219 produces the north-and-south movements of arm 35a and the cam 218 produces the east-and-west movements of arm 35a.

The vertical movements of the cams relative to the rollers 152 on carriages 54a and 64a have to be coordinated with the thread of the screw 168 so that the cam edges will be at the correct elevation at any point in the rotation of the drum 176.

Figure 24:
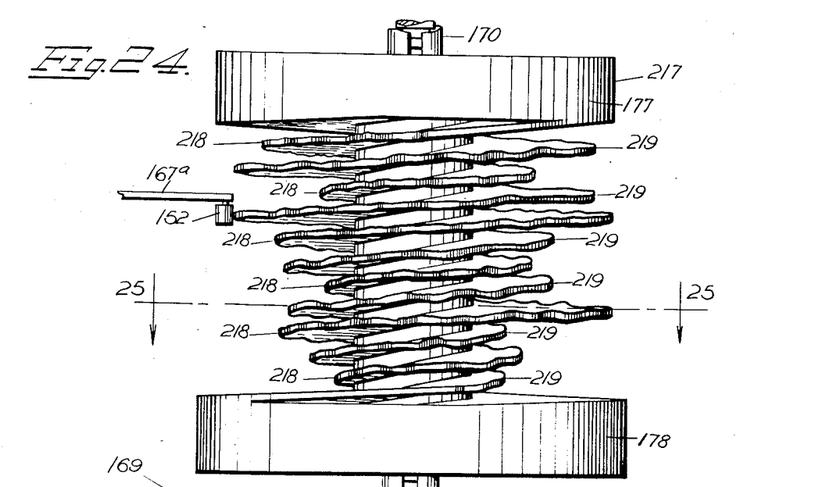
Figure 24 represents a vertical elevation of a modified record assembly.

A complete line of writing is formed by a progressively decreasing spiral of the cam edges toward the center of rotation, since there is no west-to-east arm movement otherwise recorded. The return of the pen to the westerly position at the beginning of the second line stencils a line which returns to the vertical plane of the periphery of disk 177. In Figure 24 a record for three lines of handwriting has been illustrated, but it is to be understood that this number may be increased or decreased within the limits of the size of the mechanism.

When the record has moved upwardly a sufficient distance to bring the periphery of disk 178 into engagement with rollers 152, disk 177 tilts lever 212 and forces the end of rod 214 between the carriages 64a, 57a and 54a to prevent their movement into the path of descent of disk 178.

Drum 176 is therefore free to fall in the manner hereinbefore described until it rests on stop 204. A rod 217 inserted through alined apertures in disk 178 and shoulder 181 extends into bore 180 and terminates adjacent dog 185. A collar 218 and spring 219 are mounted on rod 217 within the space between disk 178 and shoulder 181, and a wedge 220 is fastened on the upper end of rod 217 in bore 180.

When dog 185 is tripped and moved out of mesh with screw 168, it reclines against wedge 220 on rod 217. Rod 217 has a depending head 221 at its lower end which strikes stop 204 in the descent of drum 176 with the result that the rod is driven upwardly against the resistance of spring 219 until disk 178 seats upon stop 204. This action causes wedge 220 to trip dog 185 into engagement with the threads of the screw 168 and the ascending movement is repeated.

From the foregoing it appears clear that the mechanism will continue to repeat the recorded legend so long as the motor operates.

It will be understood that when the cam edges return to the plane of their original peripheries at the end of the first line of writing, engagement of rollers 152 with said edges will effect a movement of carriages 54a and 64a, with the result that the pen carried by arm 35a will be moved to its extreme left-hand position at a distance from the point of beginning of the first line of writing. In this way the respective lines of writing of each record are separated from each other.

Some means of moving the paper on which the legend is inscribed is required when the message is to be repeated, but this may be done manually by the operator of the mechanism, or mechanical means may be provided for this purpose. Since such means would involve a separate field of invention, no description of the same is contained herein.

In this modification, no means for raising and lowering the pen has been illustrated, but it is to be understood that the pen-elevating mechanism of our preferred embodiment may be incorporated in this construction if desired.

Changes and modifications may be availed of within the spirit and scope of the invention as defined in the hereunto appended claims.

What we claim and desire to secure by Letters Patent is:

1. Reproducing mechanism of the character described, comprising a track, a carriage-element mounted for reciprocation on said track, a rotary cam-unit on the carriage-element, a pen-carrying arm carried by the carriage-element, tensioned cam-followers movable in transverse directions on the carriage-element and engaging the cam-unit to be actuated thereby for imparting two-dimensional movement to the pen-carrying arm, a pen held in writing position on the pen-carrying arm, and a writing-receiving support for the pen.

2. Reproducing mechanism of the character described, comprising a carriage-element, a pen-carrying arm on the carriage-element, a pen held in writing position by said arm, a writing-receiving support for the pen, the carriage-element including a series of superposed carriages, each having a central opening and each carriage except the lowermost of the series being supported for reciprocation on the carriage immediately thereunder, the lowermost carriage being supported for reciprocation on the carriage-element, a rotary cam-unit having its axis of rotation within the central openings, and a cam-follower on two of the carriages in operative connection with the pen-carrying arm, the cam-followers being movable in transverse directions and engaging the cam-unit to be actuated thereby for imparting two-dimensional movement to the pen-carrying arm.

3. Reproducing mechanism according to claim 2, in which the direction of reciprocation of each carriage is at right angles to the direction of reciprocation of any contiguous carriage.

4. In reproducing mechanism of the character described, a carriage-element comprising upper and lower decks disposed in superposed, spaced relation, a fixed track on each deck, a series of superposed carriages between the decks, the lowermost carriage being supported for reciprocation on the track of the lower deck, an intermediate carriage being supported for reciprocation on the lowermost carriage, and the uppermost carriage being supported for reciprocation on the intermediate carriage and slidable on the track on the upper deck, the direction of movement of each carriage being at right angles to the direction of movement of any contiguous carriage, and means for imparting movement to the carriages.

5. In reproducing mechanism, a cam-unit adapted for imparting two-dimensional movement to a pen and comprising three disks in superposed, spaced relation, the uppermost disk having a peripheral edge providing a cam to direct the pen movements in one dimension, the intermediate cam having a peripheral edge providing a cam to direct the pen movements in another dimension, and the lowermost disk having a peripheral edge providing a cam to direct the progressive movement of the pen from left to right and return in a complete writing cycle.

6. In reproducing mechanism, a cam-unit adapted for imparting two-dimensional movement to a pen and comprising superposed disks, one of which has an edge providing a cam for directing pen movements in one dimension, another disk having an edge providing a cam for directing pen movements in another dimension, and a third disk having an edge providing a cam for directing movement of the pen in a complete left to right and return writing cycle.

7. In reproducing mechanism, a cam-unit adapted for imparting two-dimensional movement to a pen and comprising a rotary element having a plurality of helical cam-members, one of which has an edge providing a cam for directing pen movements in one dimension and the other member having an edge providing a cam for directing pen movements in another dimension, and the cam edges returning to the plane of the original periphery at intervals in their helical progression, one of said edges inducing a movement of the pen to return same to its starting position, and the other of said edges inducing a movement of the pen in a different dimension for spacing the starting position of separate lines of writing.

8. A photo-electric method of record production, comprising coating a plate with light-sensitive material, directing rays of light during rotation of the plate against the light-sensitive surface in a path determined by movements produced in the formation of the original being recorded, developing the light-sensitive pattern after a complete revolution of the plate, and cutting the plate along the pattern to produce a peripheral edge providing a cam-record.

9. A photo-electric method of record production, comprising coating a plate with light-sensitive material, directing rays of light during rotation of the plate at right angles to the light-sensitive surface in a path determined by movements produced in the formation of the original being recorded, developing the light-sensitive pattern after a complete revolution of the plate, and cutting the plate along the pattern to produce a peripheral edge providing a cam-record.

10. In a reproducing mechanism of the character described, the combination with a rotary element having a light-sensitive surface adapted to receive a pattern, of a light-transmitting device comprising, a light-containing chamber, a conduit extending from the chamber and having its free end overhanging the light-sensitive surface of the rotary element, a lens in the housing at an end of the conduit for directing light rays in parallel lengthwise of the conduit, and a reflector at the free end of the conduit disposed in the path of the rays for directing same at right angles against the light-sensitive surface.

11. A reproducing record comprising a sectional plate having a peripheral edge providing a cam, one of said sections being removably fitted on the other and having an edge forming a portion of the cam, and means normally holding the sections in fitted position.

12. A record of the character described, composed of separate sections fitted together to provide a cam-unit, each section having a cam edge capable of forming a complete character, and the composite edges of the assembled sections providing a cam for producing a complete legend.

13. In reproducing mechanism, the combination with a rotary cam-unit having a projecting surface, of a writing-receiving support, a spring-pressed stud depending from the support, a clamp on the stud normally engaging the support, and a roller on the stud disposed in the path of the projecting surface to be elevated thereby for movement of the clamp out of engagement with the support.

14. Reproducing mechanism of the character described, comprising a track, a carriage-element mounted for reciprocation on said track, a rotary cam-unit on the carriage-element, a pen-carrying arm carried by the carriage-element, two reciprocating cam-followers on the carriage-element in operative connection with the pen-carrying arm and engaging the cam-unit to be actuated thereby for imparting two-dimensional movement to the pen-carrying arm, and a fixed cam-follower in engagement with the cam-unit for controlling reciprocation of the carriage-element and thereby directing the writing cycle of the pen-carrying arm.

15. In reproducing mechanism of the character described, the combination with a carriage-element, inclusive of a pen-carrying arm and cam-followers in operative connection with said arm, of a rotary drum mounted for vertical reciprocation, helical cams on the drum for engagement with the cam-followers during its ascending rotation and means for holding the cam-followers out of engagement with the cams during the descending movement of the drum.

16. In reproducing mechanism of the character described, the combination with a rotary cam having on its surface a defined path of varying elevation, of a pivoted, pen-carrying arm, inclusive of a pen carried in engagement with a writing-receiving element, a floating lever engaging the arm for moving the same about its pivot, a second lever, means for supporting the floating lever and communicating movements of the second lever thereto, and a roller at an end of the second lever in continuous contact with the said path, for communicating elevation variations in said path to the pen.

17. Record-stenciling mechanism comprising a carriage element capable of reciprocation, a rotary record-receiving element on the carriage-element, a pair of styli on the carriage-element movably mounted for independent reciprocation relative to the rotary element and in operative engagement therewith, manually-operable means for transmitting movements to be recorded to said styli through the intermediary of the carriage-element, one of said styli being normally urged by said recording movements progressively toward the axis of rotation of the record-receiving element, a fixed stylus in engagement with the record-receiving element, and manually-operable means for progressive movement of the carriage-element toward the fixed stylus, co-extensive with the progressive movement of the progressively movable stylus.

18. Record-stenciling mechanism comprising a carriage-element capable of reciprocation, a rotary record-receiving element on the carriage-element, a pair of styli on the carriage-element movably mounted for independent reciprocation relative to the rotary element and in operative engagement therewith, manually-operable means for transmitting movements to be recorded to said styli through the intermediary of the carriage-element, one of said styli being normally urged by said recording movements progressively toward the axis of rotation of the record-receiving element, a fixed stylus in engagement with the record-receiving element, and manually-operable means for progressive movement of the carriage-element toward the fixed stylus, co-extensive with the progressive movement of the progressively movable stylus, the last-mentioned means being capable of reverse operation for returning the carriage-element to its original position.

19. In a reproducing mechanism of the character described, a pen carrier comprising, a hollow support, a neck slidable lengthwise in said support and capable of rotation therein transversely of the plane of its lengthwise movement, a pen holder pivoted on the neck, and means for securing the holder in selective positions.

20. Reproducing mechanism of the character described, comprising a track, a carriage-element mounted for reciprocation on said track, a rotary cam-unit on the carriage-element, a movement-directing arm carried by the carriage-element, cam-followers reciprocable in relative transverse directions on the carriage-element in operative connection with the arm and engaging the cam-unit to be actuated thereby for imparting two-dimensional movement to said arm, means for selectively directing the reciprocating movement of the carriage-element, and a copy-reproducing means in operative connection with said arm.

21. Reproducing mechanism of the character described, comprising a track, a carriage-element mounted on said track, a rotary cam-unit on the carriage-element, a movement-directing arm carried by the carriage-element, cam-followers movable in transverse directions on the carriage-element and engaging the cam-unit to be actuated thereby for imparting two-dimensional movement to the arm, a spring holding each cam-follower in constant engagement with the cam-unit, and a copy-reproducing means in operative connection with said arm.

22. Reproducing mechanism of the character described, comprising a track, a carriage-element mounted for reciprocation on said track, a rotary cam-unit on the carriage-element, a movement-directing arm carried by the carriage-element, cam-followers reciprocable in relative transverse directions on the carriage-element in operative connection with the arm and engaging the cam-unit to be actuated thereby for imparting two-dimensional movement to said arm, means for directing an intermittent reciprocating movement of the carriage-element, and a copy-reproducing means in operative connection with said arm.

23. Reproducing mechanism of the character described, comprising a carriage-element, a movement-directing arm on the carriage-element, a copy-reproducing means on the arm, the carriage-element including a series of superposed carriages and each carriage except the lowermost of the series being supported for reciprocation on the carriage immediately thereunder, the lowermost carriage being supported for reciprocation on the carriage-element, a rotary cam-unit, and a cam-follower on two of the carriages in operative connection with the arm and engaging the cam-unit to be actuated thereby for imparting two-dimensional movement to the arm.

24. Reproducing mechanism according to claim 23 in which the direction of reciprocation of each carriage is transverse to the direction of reciprocation of any contiguous carriage.

25. In reproducing mechanism of the character described, a carriage-element including a series of superposed carriages, and each carriage except the lowermost of the series being supported for reciprocation on the carriage immediately thereunder, the lowermost carriage being supported for reciprocation on the carriage-element, the direction of reciprocation of each carriage being transverse to the direction of reciprocation of any contiguous carriage, and means for imparting movement to the carriages.

26. In reproducing mechanism, a cam-unit adapted for imparting two-dimensional movement to a pen and comprising a series of cams, one of which is adapted for directing pen movements in one dimension, a second cam of the series being adapted for directing pen movements in another dimension, and a third cam in the series being adapted for directing movement of the pen in a complete left to right and return writing cycle.

27. In reproducing mechanism, a cam-unit adapted for imparting two-dimensional movement to a pen and comprising a series of cams, one of which is adapted for directing pen movements in one dimension, a second cam of the series being adapted for directing pen movements in another dimension, and a third cam in the series being adapted for directing movement of the pen in a complete left to right and return writing cycle, exclusive of its two-dimensional movement.

28. In reproducing mechanism, a cam-unit adapted for imparting two-dimensional movement to a pen and comprising a series of cams, one of which is adapted for directing pen movements in one dimension, a second cam of the series being adapted for directing pen movements in another dimension, a third cam in the series being adapted for directing movement of the pen in a complete left to right and return writing cycle, and a fourth cam for directing movements of the pen into and out of engagement with a writing-receiving support.

29. A record of the character described, comprising separate sections fitted together to provide a cam-unit, each section comprising two cam edges cooperatively associated to form a complete character, and the composite edges of the assembled sections providing a cam for producing a complete legend.

30. A record of the character described, comprising separate sections fitted together to provide a cam-unit, each section comprising two cam edges disposed at different elevations and cooperatively associated to form a complete character, and the composite edges of the assembled sections providing a cam-unit for producing a complete legend.

31. A record of the character described, comprising separate sections fitted together to provide a cam-unit, each section having a cam edge capable of forming a complete character and having a second cam edge capable of raising and lowering a character forming element, and the composite edges of the assembled sections providing a cam for producing a complete legend.

32. A record assembly of the character described, a plurality of separate sections fitted together to provide a cam for producing a complete legend, the sections having irregular cam-edges capable of forming characters in the legend, and at least one of the sections having a symmetrical edge capable of producing a space between characters of the legend.

33. In a record assembly of the character described, a cam section comprising a body portion and a cam edge on the body portion capable of producing a complete character, the opposite ends of the cam edge being disposed in symmetrical relation to the lengthwise axis of the body portion.

34. A record assembly of the character described, a plurality of separate sections fitted together to provide a cam for producing a complete legend, the sections having irregular cam-edges capable of forming characters in the legend, and a plurality of sections each having a symmetrical edge capable of producing a space between characters of the legend, the symmetrical edges being of different lengths to vary the space produced.

35. A record assembly of the character described, a plurality of separate sections fitted together to provide a cam for producing a complete legend, the sections having irregular cam-edges capable of forming characters in the legend, and at least one of the sections having a symmetrical edge capable of producing a space between characters of the legend, the cam edges of at least two of the sections being of different lengths.

36. A record of the character described, comprising separate sections fitted together to provide a cam-unit, each section comprising two cam edges disposed at different elevations and cooperatively associated to form a complete character, the composite edges of the assembled sections providing a cam-unit for producing a complete legend, and means for holding the assembled sections at one elevation against movement independent of the assembled sections at another elevation.

37. In reproducing mechanism, the combination with a rotary cam-unit having a projecting surface, of a writing receiving support, a movable clamping-element normally engaging the support, and a roller in operative connection with the clamping-element and disposed in the path of the projecting surface of the cam-unit to be moved thereby for movement of the clamp out of engagement with the support.

38. Reproducing mechanism of the character described comprising a track, a carriage-element mounted for reciprocation on said track, a rotary cam-unit on the carriage-element, a movement-directing arm carried by the carriage-element, two cam-followers on the carriage-element in operative connection with the movement-directing arm and engaging the cam-unit to be actuated thereby for imparting two-dimensional movement to said arm, and a third cam-follower in engagement with the cam-unit for controlling reciprocation of the carriage-element and thereby directing the cycle of the movement-directing arm.

39. In reproducing mechanism of the character described, the combination with a carriage-element inclusive of a movement-directing arm and cam-followers in operative connection with said arm, of a rotary drum mounted for vertical reciprocation, helical cams on the drum for engagement with the cam-followers during ascending its rotation, and an elevating mechanism for the drum, the mechanism being releasable at a determinate elevation to permit gravitational descent of the drum.

40. In reproducing mechanism of the character described, the combination with a carriage-element, inclusive of a movement-directing arm and cam-followers in operative connection with said arm, of a rotary drum mounted for reciprocation, cams on the drum for engagement with the cam-followers during its rotation, a driving mechanism in operative connection with the drum for its reciprocation, and means for releasing the driving connection with the drum at a predetermined point in its reciprocating cycle.

41. In reproducing mechanism of the character described, the combination with a carriage-element, inclusive of a movement-directing arm and cam-followers in operative connection with said arm, of a rotary drum mounted for reciprocation, cams on the drum for engagement with the cam-followers during its rotation, a driving mechanism in operative connection with the drum for its reciprocation, means for releasing the driving connection with the drum at a predetermined point in its reciprocating cycle, and means for reestablishing the driving connection with the drum at a predetermined point in its reciprocating cycle.

42. In reciprocating mechanism of the character described, the combination with a carriage-element, inclusive of a movement-directing arm and cam-followers in operative connection with said arm, of a rotary drum mounted for vertical reciprocation, helical cams on the drum for engagement with the cam-followers during its rotation, a driving mechanism in operative connection with the drum for its reciprocation, means for releasing the driving connection with the drum at a predetermined elevation to permit its descent by gravity, means for holding the cam-followers out of engagement with the cams during the descending movement of the drum, and means for reestablishing the driving connection at a predetermined point in the gravitational descent of the drum.

43. A device for producing records for reproduction, comprising a rotary element, a series of interconnected reciprocating carriages, one of said carriages being movable in response to movements in the formation of an original being reproduced, means on a second carriage of the series for tracing a path on the element during its rotation, directed by movements of the first-mentioned carriage, and means on a third carriage of the series for tracing a second path on the element during its rotation, directed by movements of the first-mentioned carriage.

44. Record producing mechanism, comprising a carriage element capable of reciprocation, a rotary record-receiving element on the carriage-element, means movably mounted on the carriage-element for independent reciprocation relative to the rotary element and capable of tracing a plurality of separate paths thereon during its rotation, and a manually-operable element for transmitting movements to be recorded to said tracing means through the intermediary of the carriage-element.

45. In reproducing mechanism of the character described, a support for a copy-reproducing element comprising, a bar projecting from a movement-directing element, a shaft on the bar, a hollow standard providing a socket, mounted on the shaft, an extension slidably fitted in the socket and carrying a copy-reproducing element, means for holding the extension in selective positions in the socket, and means for limiting movement of the standard about its pivot.

46. Reproducing mechanism of the character described, comprising a carriage-element, a rotary cam-unit on the carriage-element, a copy-reproducing means carried by the carriage-element, and cam-followers on the carriage-element reciprocable in planes at substantially ninety degrees to each other in operative connection with the copy-reproducing means, and engaging the cam-unit to be actuated thereby for imparting two-dimensional movement to said copy-reproducing means.

47. In a reproducing mechanism of the character described, a carriage-element, inclusive of a plurality of reciprocating carriages in operative connection, a rotary cam carried by the carriage-element, an arm on one of said carriages, a copy reproducing means on the arm, having a universal movement independent of its movement by the arm, and means on a second carriage, engaging the cam to be actuated thereby for imparting a reproducing movement to the copy reproducing means.

48. In a reproducing mechanism of the character described, a carriage-element, a cam mounted for rotation on the carriage-element, a carriage in the carriage-element mounted for reciprocation relative to the cam, a cam-follower carried on the carriage for engagement with the cam, and a spring carried on the carriage-element in operative connection with the cam-follower for holding the cam-follower in constant engagement with the cam.

49. In reproducing mechanism of the character described, a movement-directing element, an arm pivotally connected with said element, a copy reproducing means carried by the arm, a stop disposed in the path of rotation of the arm, and an adjusting screw on the arm disposed in engagement with the stop for locating the arm in selective positions.

50. In reproducing mechanism of the character described, the combination with a carriage-element inclusive of a movement-directing arm and a cam-follower in operative connection therewith, of a rotary drum mounted for vertical reciprocation, a cam on the drum for engagement with the cam-follower during its ascending rotation, and an elevating mechanism for the drum, the mechanism being releasable at a selective elevation to permit gravitational descent of the drum.

51. Record producing mechanism, comprising a carriage element capable of reciprocation, a rotary record-receiving element on the carriage-element, means movably mounted on the carriage-element for independent reciprocation relative to the rotary element and capable of tracing a plurality of separate paths thereon during its rotation, a manually-operable element for transmitting movements to be recorded to said tracing means through the intermediary of the carriage-element, and a crank in operative connection with the carriage-element for its selective movement during operation of the manually-operable element.

52. Reproducing mechanism of the character described, comprising a track, a carriage-element mounted on said track, a rotary cam-unit on the carriage-element, a pen-carrying arm carried by the carriage-element, cam-followers on the carriage-element reciprocable along lines at substantially ninety degrees to each other throughout, in operative connection with the pen-carrying arm and engaging the cam-unit to be actuated thereby for imparting two-dimensional movement to the pen-carrying arm, a pen held in writing position on the pen-carrying arm, and a writing-receiving support for the pen.

53. Reproducing mechanism of the character described, comprising a track, a carriage-element mounted on said track, a rotary cam-unit on the carriage-element, a pen-carrying arm carried by the carriage-element, cam-followers on the carriage-element reciprocable along lines at substantially ninety degrees to each other throughout, in operative connection with the pen-carrying arm and engaging the cam unit to be actuated thereby for imparting two-dimensional movement to the pen-carrying arm, exclusive of its reciprocating movement with the carriage-element, a pen held in writing position on the pen-carrying arm, and a writing-receiving support for the pen.

54. Reproducing mechanism of the character described, comprising a track, a carriage-element mounted for reciprocation on said track, a rotary cam-unit on the carriage-element, a pen-carrying arm carried by the carriage-element, cam followers on the carriage-element reciprocable along lines at substantially ninety degrees to each other throughout, in operative connection with the pen-carrying arm and engaging the cam-unit to be actuated thereby for imparting two-dimensional movement to the pen-carrying arm, a pen held in writing position on the pen-carrying arm, and a writing-receiving support for the pen.

55. Reproducing mechanism of the character described, comprising a track, a carriage-element mounted on said track, a rotary cam-unit on the carriage-element, a movement-directing arm carried by the carriage-element, cam followers on the carriage-element reciprocable along lines at substantially ninety degrees to each other throughout, in operative connection with the arm and engaging the cam-unit to be actuated thereby for imparting two-dimensional movement to said arm, and a copy-reproducing means in operative connection with said arm.

56. Reproducing mechanism of the character described, comprising a track, a carriage-element mounted on said track, a rotary cam-unit on the carriage-element, a movement-directing arm carried by the carriage-element, cam-followers engaging the cam-unit at opposite sides of the same, one of said cam-followers being reciprocable along the imaginary line connecting the cam-followers, the said cam-followers being effective for imparting separate movements to the arm, and a copy-reproducing means in operative connection with said arm.

57. In a photo-electric method of record production of the character described, the steps of directing rays of light against a light-sensitive surface, controlled by movements in an original being recorded, whereby to cause a chemical change in the surface acted on by the rays, and then developing the light sensitive surface to produce a permanent record of said movements.

58. In a reproducing mechanism of the character described, a rotary element having a projecting end portion, free for the removal of a cam-element beyond the same, a cam-element slidably mounted thereon in a condition to be freely interchanged with other similar units, means for holding the cam-unit against movement lengthwise of the element during its rotation, a copy-reproducing means, and means for actuation of the reproducing means by movement of the cam-unit.

JOHN O. BURDETTE.
HENRY H. RAGATZ.